United States Patent [19]

Fukuoka

[11] Patent Number: 5,614,946
[45] Date of Patent: Mar. 25, 1997

[54] STILL CAMERA WITH TIME DIVISION RECORDING OF AUDIO AND VIDEO SIGNALS

[75] Inventor: Hiroki Fukuoka, Kawasaki, Japan

[73] Assignee: Ricoh Company, Ltd., Tokyo, Japan

[21] Appl. No.: 340,450

[22] Filed: Nov. 14, 1994

Related U.S. Application Data

[63] Continuation of Ser. No. 65,493, May 24, 1993, abandoned.

[30] Foreign Application Priority Data

Jun. 11, 1992 [JP] Japan .................................. 4-152112
Apr. 22, 1993 [JP] Japan .................................. 5-096061

[51] Int. Cl.⁶ ........................................... H04N 5/76
[52] U.S. Cl. ...................... 348/232; 348/405; 348/410; 348/423; 382/232; 386/107; 386/117
[58] Field of Search ................................. 348/207, 231, 348/232, 374, 375, 462, 395, 400, 403–405, 423, 432–435; 358/909.1, 341, 343; 382/232, 233, 251

[56] References Cited

U.S. PATENT DOCUMENTS

| | | | |
|---|---|---|---|
| 4,665,431 | 5/1987 | Cooper | 358/145 |
| 4,745,476 | 5/1988 | Hirashima | 358/145 |
| 4,890,321 | 12/1989 | Seth-Smith et al. | 380/20 |
| 5,016,107 | 5/1991 | Sasson et al. | 358/209 |
| 5,023,727 | 6/1991 | Boyd et al. | 358/310 |
| 5,034,804 | 7/1991 | Sasaki et al. | 358/41 |
| 5,062,010 | 10/1991 | Saito | 360/35.1 |
| 5,097,363 | 5/1992 | Takei et al. | 360/10.3 |
| 5,170,262 | 12/1992 | Kinoshita et al. | 358/335 |
| 5,202,798 | 4/1993 | Takei et al. | 360/35.1 |
| 5,216,516 | 6/1993 | Tanaka et al. | 358/426 |
| 5,249,052 | 9/1993 | Yoshimura et al. | 358/335 |
| 5,257,113 | 10/1993 | Chen et al. | 358/426 |
| 5,260,738 | 11/1993 | Yamagishi et al. | 354/413 |
| 5,289,548 | 2/1994 | Wilson et al. | 382/250 |
| 5,291,282 | 3/1994 | Nakagawa et al. | 348/384 |
| 5,295,077 | 3/1994 | Fukuoka | 358/909.1 |
| 5,337,051 | 8/1994 | Tsui | 342/13 |
| 5,355,232 | 10/1994 | Kataoka | 358/451 |
| 5,363,097 | 11/1994 | Jan | 341/67 |
| 5,376,965 | 12/1994 | Nagasaki et al. | 348/232 |
| 5,389,965 | 2/1995 | Kuzma | 348/14 |
| 5,402,123 | 3/1995 | Jung | 341/63 |
| 5,418,617 | 5/1995 | Naimpally et al. | 348/413 |
| 5,475,433 | 12/1995 | Jeons | 348/419 |
| 5,481,554 | 1/1996 | Kondo | 371/53 |
| 5,497,194 | 3/1996 | Sakagami et al. | 348/222 |

FOREIGN PATENT DOCUMENTS 4029240  3/1991  Germany .

OTHER PUBLICATIONS

"Fotos Auf Floppies", Von Peter Kaisert, pp. 40–42, Dec. 2, 1988 (w/translation).

Primary Examiner—Leo Boudreau
Assistant Examiner—Bipin Shalwala
Attorney, Agent, or Firm—Oblon, Spivak, McClelland, Maier & Neustadt, P.C.

[57] ABSTRACT

A still camera has a photographing device for photographing a photographed object and outputting image data; an image data coder for coding the image data; a recorder for recording the coded image data to a recording medium; a converter for converting a voice to an electric signal; a voice data coder for coding voice data converted to the electric signal; a recorder for recording the coded voice data to the recording medium; and a device for sharing the image data coder and the voice data coder in time division. The still camera may have a time divisional coder for sharing-portions of the image data coder and the voice data coder in time division. The time divisional coder codes the image data for an effective image data period and codes the voice data for a vertical or horizontal blanking period. In this still camera, the photographed image and the voice can be preferably recorded and reproduced from the recording medium by a simplified structure.

8 Claims, 8 Drawing Sheets

STILL CAMERA WITH TIME DIVISION RECORDING OF AUDIO AND VIDEO SIGNALS

This application is a continuation of application Ser. No. 08/065,493, filed on May 24, 1993, now abandoned.

BACKGROUND OF THE INVENTION

1. Field of the Invention

The present invention relates to a still camera for coding and decoding image data and voice data with respect to a photographed image and recording and reproducing these data from a recording medium.

2. Description of the Related Art

When a photographing operation of such a still camera is continuously performed at a high speed, it is possible to obtain a reproduced image such as a moving picture. For example, an NTSC signal can be obtained if a field picture is recorded and telproduced every 1/60 second.

Accordingly, when the continuous photographing operation is performed to obtain a reproduced image such as a moving picture in the above still camera, it is desirable to perform a reproducing operation in addition to a voice which is not required so much in the case of a still picture. For example, Japanese Patent Application Laying Open (KOKAI) No. 2-280484 shows a camera for recording and reproducing a visual image and a voice. This camera can record a continuously photographed image and a continuously spoken voice.

In the above camera for recording and reproducing a visual image and a voice, it is necessary to dispose a processing circuit for recording an aural signal so that the camera is large-sized. Further, when there is no change in sound volume in accordance with purposes of utilization such as narration and back ground music (BGM), all voices are uniformed at a reproducing time of the camera so that it is hard to hear and understand these voices. Furthermore, an editing operation of the image and the voice is complicated when the image and the voice are simply recorded to a recording medium.

SUMMARY OF THE INVENTION

It is therefore an object of the present invention to provide a still camera for preferably recording and reproducing a photographed image and a voice from a recording medium by a simplified structure.

In accordance with a first structure of the present invention, the above object can be achieved by a still camera comprising photographing means for photographing a photographed object and outputting image data; image data coding means for coding the image data; means for recording the coded image data to a recording medium; means for converting a voice to an electric signal; voice data coding means for coding voice data converted to the electric signal; means for recording the coded voice data to the recording medium; and means for sharing the image data coding means and the voice data coding means in time division.

In accordance with a second structure of the present invention, the image data coding means and the voice data coding means have a quantizing processing section of a discrete cosine transformation and a weight of each of frequency bands of a quantizing table can be changed in accordance with a voice mode set from the exterior of the camera.

In accordance with a third structure of the present invention, unit voice data can be recorded to a header portion of a still picture image file in the recording medium.

In accordance with a fourth structure of the present invention, the above object can be also achieved by a still camera comprising photographing means for photographing a photographed object and outputting image data; image data coding means for coding the image data; means for recording the coded image data to a recording medium; means for converting a voice an electric signal; voice data coding means for coding voice data converted to the electric signal; means for recording the coded voice data to the recording medium; and time divisional coding means for sharing portions of the image data coding means and the voice data coding means in time division; the time divisional coding means coding the image data for an effective image data period and coding the voice data for a vertical or horizontal blanking period.

In accordance with a fifth structure of the present invention, the voice data coding means has a memory for storing the voice data before coding for the effective image data period.

In accordance with a sixth structure of the present invention, an interrupt signal relative to the completion of coding processing of effective image data can be outputted from the image data coding means to central processing means.

In accordance with a seventh structure of the present invention, the image data coding means makes a quantizing table by scaling and calculating a basic quantizing table using a scale factor, and the central processing means can read the quantizing table.

In accordance with an eighth structure of the present invention, a sampling frequency of the voice in the converting means for converting this voice to an electric signal is set to an integer multiple of a frame frequency or a field frequency of an image.

In accordance with a ninth structure of the present invention, the above object can be also achieved by a still camera comprising means for reading coded image data out of a recording medium; image data decoding means for decoding the read image data; means for reading coded voice data out of the recording medium; voice data decoding means for decoding the read voice data; and time divisional decoding means for sharing portions of the image data decoding means and the voice data decoding means in time division; the time divisional decoding means decoding the image data for an effective image data period and decoding the voice data for a vertical or horizontal blanking period.

In accordance with a tenth structure of the present invention, the voice data coding means has a memory for storing the decoded voice data for the effective image data period.

In accordance with an eleventh structure of the present invention, an interrupt signal relative to the completion of decoding processing of effective image data can be outputted from the image data decoding means to central processing means.

As mentioned above, in the first structure of the still camera of the present invention, the image data coding means and the voice data coding means are shared in time division. Accordingly, image and voice data can be recorded to a recording medium so that the size of a circuit structure constituting the coding means, cost of the circuit structure and power consumption can be reduced.

In the second structure of the present invention, a weight of each of frequency bands of the quantizing table is changed so that voice recording frequency characteristics can be arbitrarily changed in accordance with purposes of uses and a voice can be recorded in a desirable state.

In the third structure of the present invention, unit voice data are recorded to a header portion of a still picture image file so that the synchronous relation between the image and voice data is held even when the image data are edited. Further, the image data are edited in conformity with a general still picture standard format.

In accordance with the fourth structure of the present invention, portions of the image data coding means and the voice data coding means are shared in time division. The image data are coded for an effective image data period. The voice data are coded for a vertical or horizontal blanking period. Accordingly, the time division can be efficiently made so that the still camera can be made compact and cheaply manufactured.

In accordance with the fifth structure of the present invention, the voice data coding means has a memory for storing the voice data before coding for the effective image data period. Accordingly, the voice data can be coded without losing the voice data for the effective image data period.

In accordance with the sixth structure of the present invention, the image data coding means transmits the completion of coding processing of effective image data to a CPU by using an interrupt signal. Accordingly, when the image data coding means is constructed by a variable length coding system, it is not necessary for the CPU to monitor the completion of image data coding at any time so that system performance can be improved.

In accordance with the seventh structure of the present invention, the image data coding means makes a quantizing table by scaling and calculating a basic quantizing table using a scale factor, and a microprocessor can read the quantizing table. Accordingly, when JPEG as a still picture coding international standard is used in an image data coding system and the scale factor is used to control a coding amount, it is not necessary to take time for calculating the quantizing table recorded to a JPEG file by the central processing unit (CPU) so that a moving picture can be recorded.

In the eighth structure of the present invention, a sampling frequency of a voice in the converting means for converting this voice to an electric signal is set to an integer multiple of a frame frequency or a field frequency of an image. Accordingly, for example, when the voice for a field period is recorded to a header region of the JPEG file, a unit recording period of the voice is equal to an integer multiple of that of the image so that the synchronous relation between the voice and the image is completely provided.

In the ninth structure of the present invention, portions of the image data decoding means and the voice data decoding means are shared in time division. The image data are decoded for an effective image data period and the voice data are decoded for a vertical or horizontal blanking period. The ninth structure commonly has image and voice decoding sections so that the construction of the decoding means is simplified and the time division is efficiently made and the still camera can be made compact and cheaply manufactured.

In the tenth structure of the present invention, the voice data coding means has a memory for storing the decoded voice data for the effective image data period. Accordingly, the voice data are held and normally outputted while the image data are decoded.

In the eleventh structure of the present invention, the completion of decoding processing of effective image data can be transmitted from the image data decoding means to the central processing unit by using an interrupt signal. Accordingly, when the image data coding means is constructed by a variable length coding system, it is not necessary for the CPU to monitor the completion of image data decoding at any time so that system performance can be improved.

Further objects and advantages of the present invention will be apparent from the following description of the preferred embodiments of the present invention as illustrated in the accompanying drawings.

DESCRIPTION OF THE PREFERRED EMBODIMENTS

The preferred embodiments of a still camera in the present invention will next be described in detail with reference to the accompanying drawings.

Figure 1:
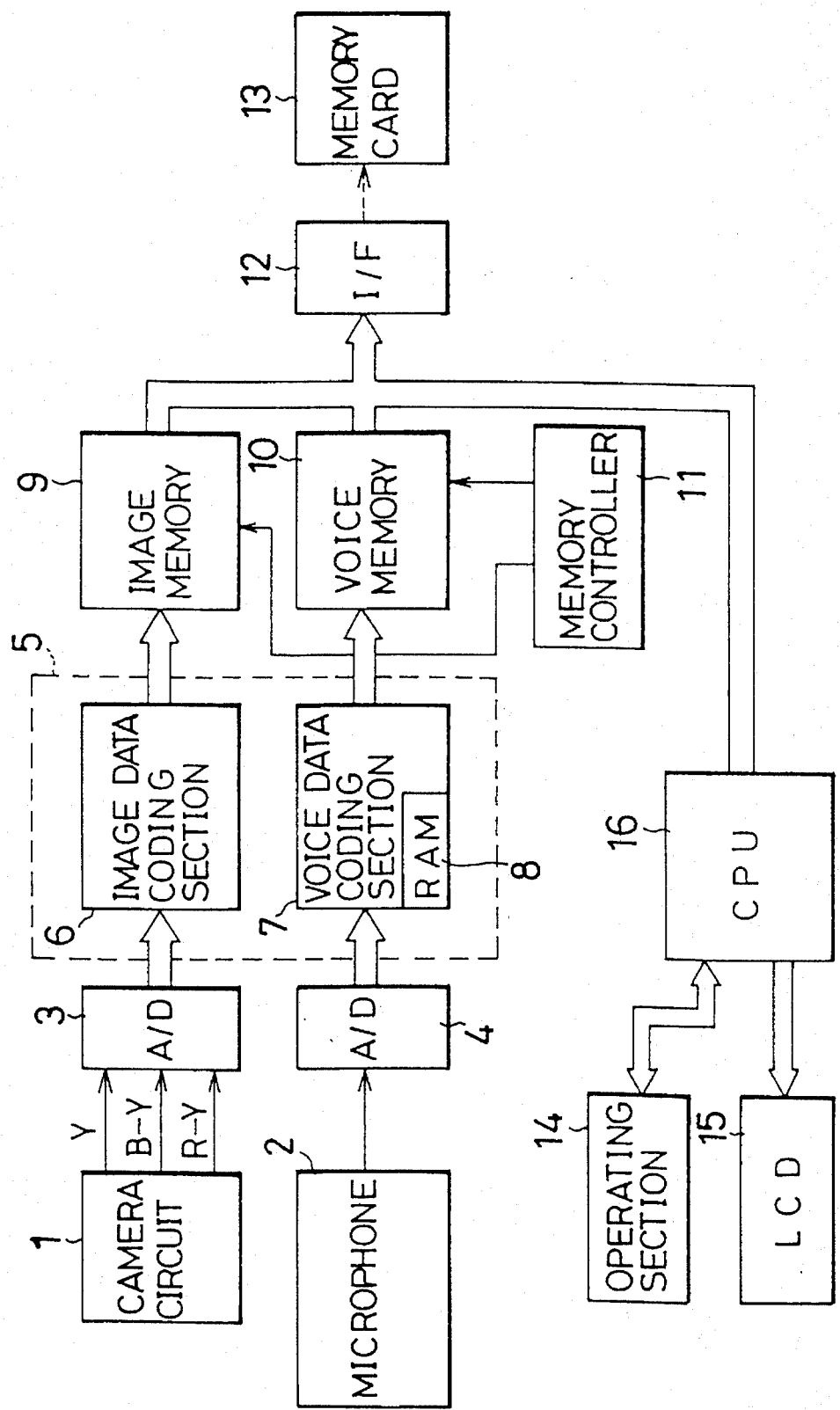
FIG. 1 is a block diagram showing the construction of a still camera in accordance with a first embodiment of the present invention.

FIG. 1 is a block diagram showing the construction of a still camera in accordance with a first embodiment of the present invention. In FIG. 1, a known camera circuit 1 is constructed by a charge coupled device (CCD), etc. as a photographing means. A microphone 2 converts a voice to an electric signal. Each of reference numerals 3 and 4 designates an analog/digital (A/D) converting circuit. A data coding section 5 has an image data coding section 6 and a voice data coding section 7. A buffer random access memory (buffer RAM) 8 corresponding to one field time is disposed in the voice data coding section 7. An image memory 9 is disposed to store image data. A voice memory 10 is disposed to store voice data. A memory controller 11 is disposed to control operations of the image memory 9 and the voice memory 10.

An interface (I/F) circuit 12 is disposed to electrically connect a memory card 13 as a recording medium to each of constructional portions of the camera. An operating section 14 is disposed to set various kinds of operating modes of the camera. A liquid crystal display (LCD) 15 displays a set operating mode of the camera. A central processing unit (CPU) 16 controls operations of the above constructional pot t ions of the camera.

In FIG. 1, the data of a photographed image picked up by the charge coupled device (CCD) of the camera circuit 1 are converted to a digital signal by the A/D converting circuit 3 and are transmitted to the image data coding section 6. The image data are coded in the image data coding section 6 by a DCT system as a compression standard of a still picture and are stored to the image memory 9. The image memory 9 has a First-In First-Out (FIFO) structure so that the image data are sequentially recorded to the memory card 13 through the interface circuit 12.

The above processings are executed in real time in synchronization with each of synchronous signals outputted from an unillustrated synchronous signal generating circuit.

A voice is converted to an electric signal by the microphone 2 and is further converted to a digital signal by the A/D converting circuit 4. Voice data are coded by the voice data coding section 7 and are stored to the voice memory 10. The voice memory 10 also has a First-In First-Out (FIFO) structure so that the voice data are sequentially recorded to the memory card 13 through the interface circuit 12.

Figure 2:
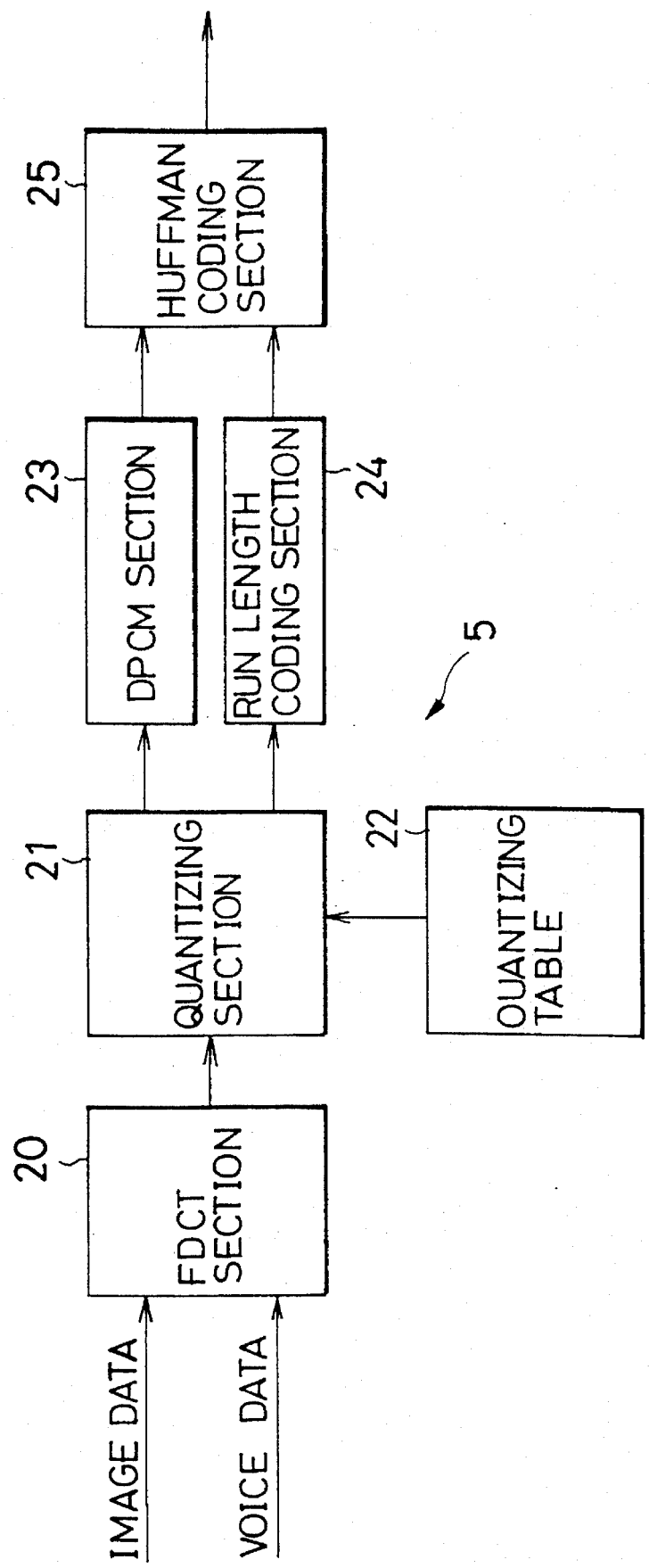
FIG. 2 is a block diagram showing the construction of a data coding section.

FIG. 2 is a block diagram showing the construction of the above data coding section 5. Reference numerals 20, 21 and 22 respectively designate a Forward DCT (FDCT) section, a quantizing section and a quantizing table. Reference numerals 23, 24 and 25 respectively designate a differential PCM (DPCM) section, a run length coding section 24 and a Huffman coding section.

In FIG. 2, image data and voice data are inputted to the quantizing section 21 through the FDCT section 20 and are quantized in this quantizing section 21 in accordance with the quantizing table 22 set from the above CPU 16. The quantized data are then Huffman-coded and outputted by the Huffman coding section 25 through the DPCM section 23 and the run length coding section 24.

Figure 3:
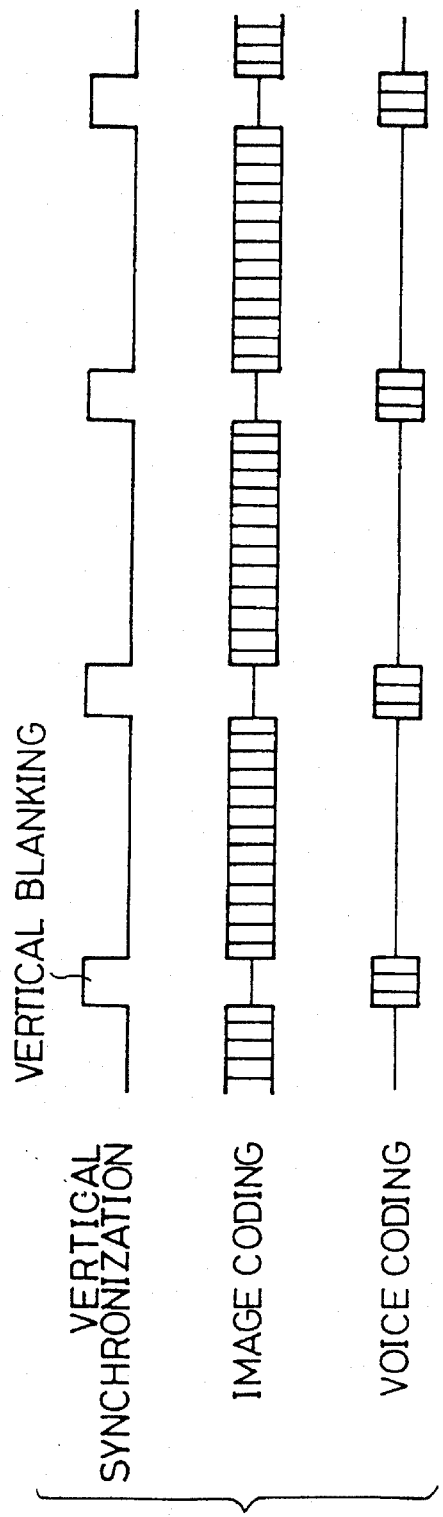
FIG. 3 is a timing chart of time divisional processing of image data and voice data

FIG. 3 is a timing chart of time divisional processing of the image data and the voice data. The time divisional processing with respect to the voice data is performed for a vertical blanking period of the image data. The time divisional processing with respect to the image data is performed for a period except for the vertical blanking period. The above buffer RAM 8 is disposed in the voice data coding section 7 to perform this time divisional processing.

Figure 4:
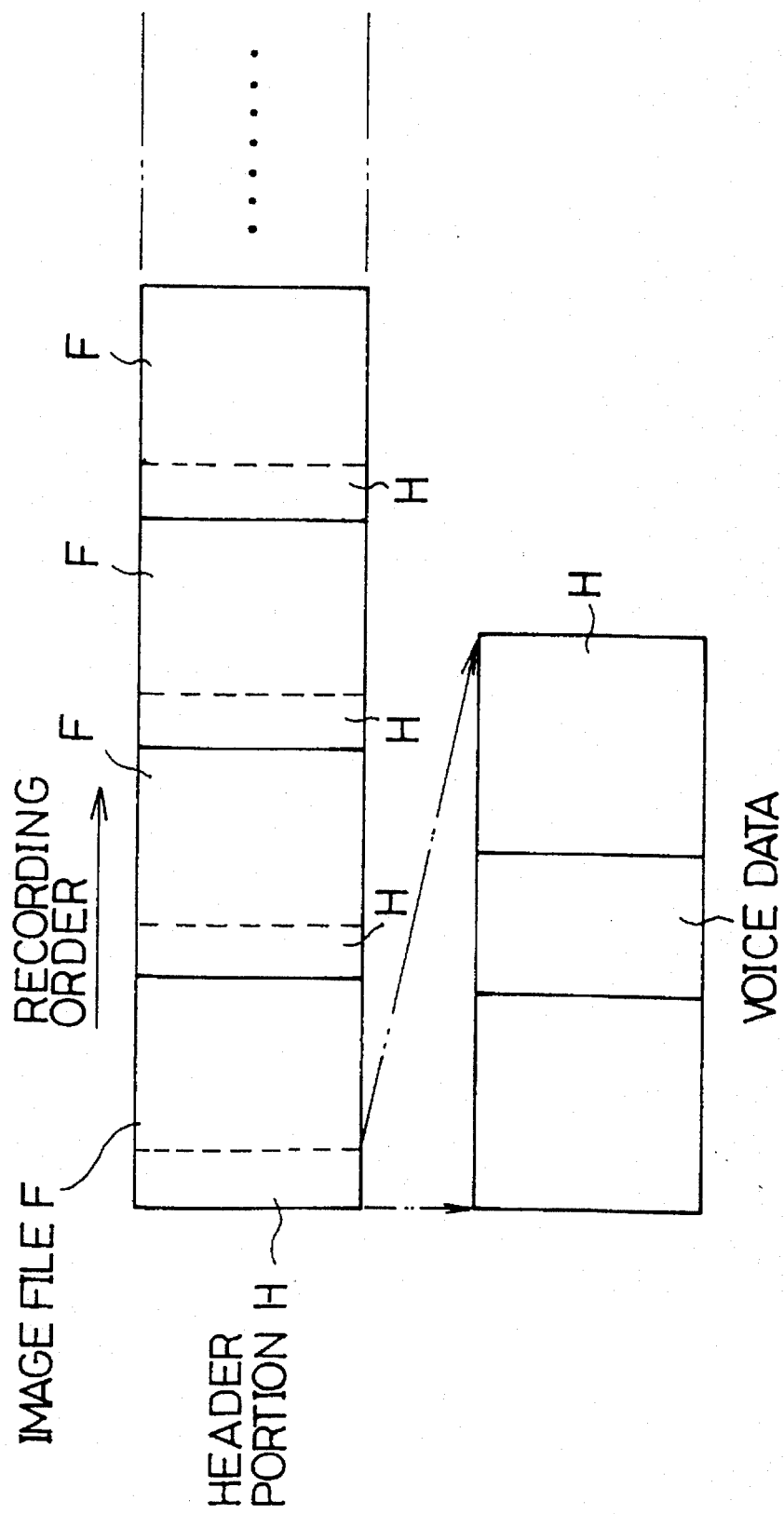
FIG. 4 is a view for explaining a recording state of data in a memory card.

FIG. 4 is a view for explaining a recording state of data in the memory card 13. An upper portion of FIG. 4 shows an image file continuously photographed in real time. A lower portion of FIG. 4 shows the interior of a header portion of the image file.

In FIG. 4, only one image file of a still picture is provided at a normal photographing time of the camera. However, an image file F of a still picture is continuously recorded at a continuous photographing time of the camera. Compressed unit voice data corresponding to one field time (1/60 second) or one frame time (1/30 second) are inserted and recorded to the header portion H of the image file F. An amount of these voice data is very small in comparison with an amount of the image data.

Accordingly, the synchronous relation between the image data and the voice data is held even when the image data are edited. Further, the image data are easily edited in conformity with a general still picture standard format.

Quantization processing with respect to a discrete cosine transformation can be performed in the quantizing section 21 of the above data coding section 5. Further, a voice mode can be set from the operating section 14, etc. in FIG. 1. Accordingly, a weight of each of frequency bands the above quantizing table 22 can be changed in accordance with purposes of uses of a recorded voice without adding any special circuit. Therefore, for example, it is possible to record the voice data in sound volume suitable for narration or BGM.

Figure 5:
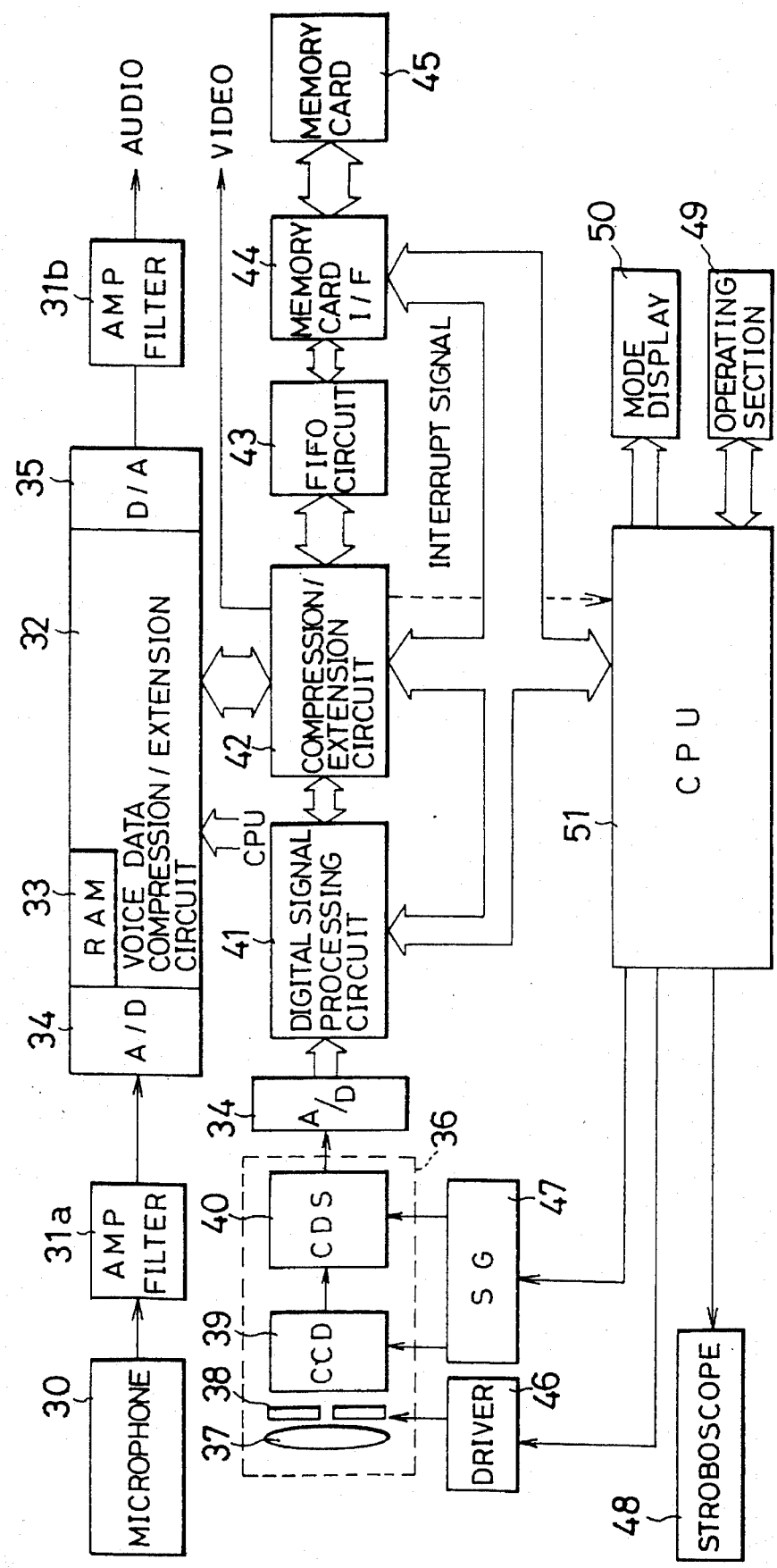
FIG. 5 is a block diagram showing the construction of a still camera in accordance with a second embodiment of the present invention.

FIG. 5 is a block diagram showing the construction of a still camera in accordance with a second embodiment of the present invention. In FIG. 5, reference numeral 30 designates a microphone and each of reference numerals 31a and 31b designates an amplifier. A voice data compression/ extension circuit 32 constitutes a voice data coding means and a voice data decoding means for respectively coding and decoding voice data. A RAM 33 constitutes a memory means disposed in the voice data compression/extension circuit 32. Reference numerals 34 and 35 respectively designate an analog/digital (A/D) converting circuit and a digital/analog (D/A) converting circuit.

A camera image pickup section 36 is composed of an image pickup lens 37, a diaphragm 38, a charge coupled device (CCD) 39, a camera control section (CDS) 40, etc. A digital signal processing circuit 41 performs various kinds of image processings. An image data compression/extension circuit 42 constitutes an image data coding means and an image data decoding means for respectively coding and decoding image data. Reference numeral 43 designates a First-In First-Out (FIFO) circuit. A memory card I/F 44 constitutes an interface circuit between the FIFO circuit 43 and a memory circuit 45.

Reference numeral 46 designates a driving section (or a driver) of a mechanical system of the above camera image pickup section 36. Reference numeral 47 designates a timing signal generating section (SG) of an electric system of the camera image pickup section 36. A stroboscope 48 constitutes an illuminating means. An operating section 49 is disposed to set various kinds of operating modes of the still camera. A mode display section 50 displays a set operating mode. A central processing unit (CPU) 51 controls operations of these constructional portions of the still camera.

In FIG. 5, when a photographed image is focused and formed by the image pickup lens 37 as an image on the charge coupled device (CCD) 39, image data are outputted from the charge coupled device 39 and gain control of the image data is performed by the camera control section (CDS) 40. The image data are then converted to digital data by the A/D converting circuit 34. Gamma correction and aperture correction are made by the digital signal processing circuit 41 with respect to the digital data. The corrected image data are transmitted to the image data compression/ extension circuit 42 and are coded by this circuit 42. The coded image data are inputted to the FIFO circuit 43 and are recorded to the memory card 45 through the memory card I/F 44.

In contrast to this, a voice is converted to an electric signal by the microphone 30 and is amplified by the amplifier 31a. The amplified signal is then converted to digital data by the A/D converting circuit 34 and is temporarily stored to the RAM 33 of the voice data compression/extension circuit 32. Therefore, the digital data can be coded without losing the voice data for an effective image data period as described later.

Figure 6:
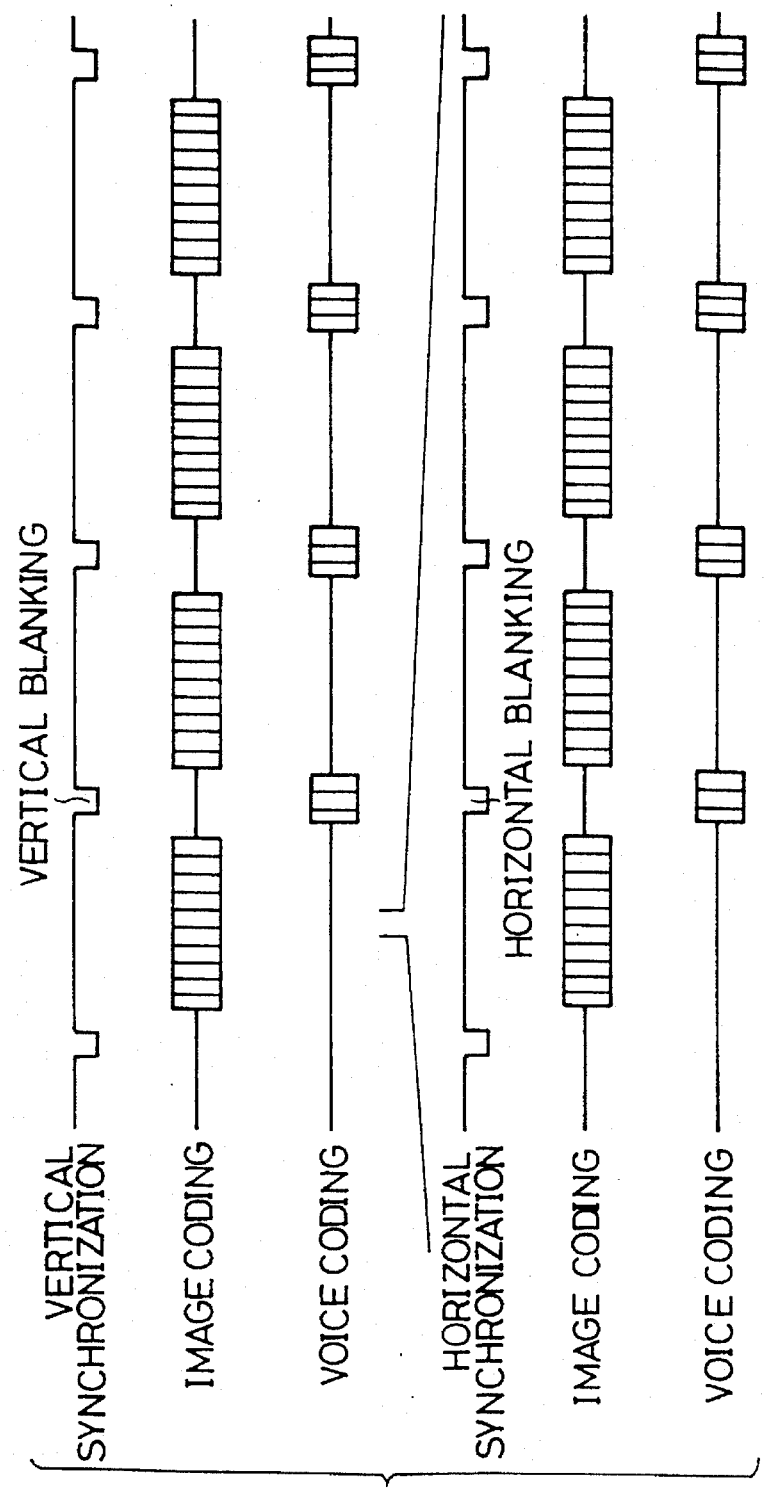
FIG. 6 is a timing chart of time divisional processing of image data and voice data.

As shown in FIG. 6, the voice data stored to the RAM 33 are read for a vertical or horizontal blanking period of the image data and are coded by the voice data compression/ extension circuit 32. The coded voice data are recorded to the memory card 45 through the CPU 51 and the memory card I/F 44.

When the voice data recorded to the memory card 45 are reproduced, the image data and the voice data are transmitted to the FIFO circuit 43 through the memory card I/F 44. The image data are extended or decoded by the image data compression/extension circuit 42 and are outputted as a video signal through the digital signal processing circuit 41.

In contrast to this, the voice data are read out of the memory card 45 through the CPU 51 for the vertical or horizontal blanking period. The voice data are then transmitted to the voice data compression/extension circuit 32 and are extended or decoded by this circuit 32.

The extended voice data are temporarily stored to the RAM 32 and are then outputted as an audio signal through the amplifier 31b. Accordingly, the voice data can be normally outputted in conformity with extension processing of the image data.

FIG. 6 is a timing chart of time divisional sharing of image and voice coding sections. In the case of an NTSC system, a valid area with respect to a frame image is set for 480 horizontal periods among 525 horizontal periods and an invalid area is set for the remaining 45 horizontal periods. 768 pixels among 910 pixels constitute the valid area for the horizontal periods and the remaining pixels constitute the invalid area.

As shown in FIG. 6, the image data are coded by using a coding means for an effective image period. Voice data for this effective image period are stored to the above RAM 33 for the effective period of an A/D converted data image. These voice data are coded for an ineffective image period. In this example, it is sufficient to dispose a RAM for storing the voice data and having a capacity corresponding to the horizontal periods.

Figure 7:
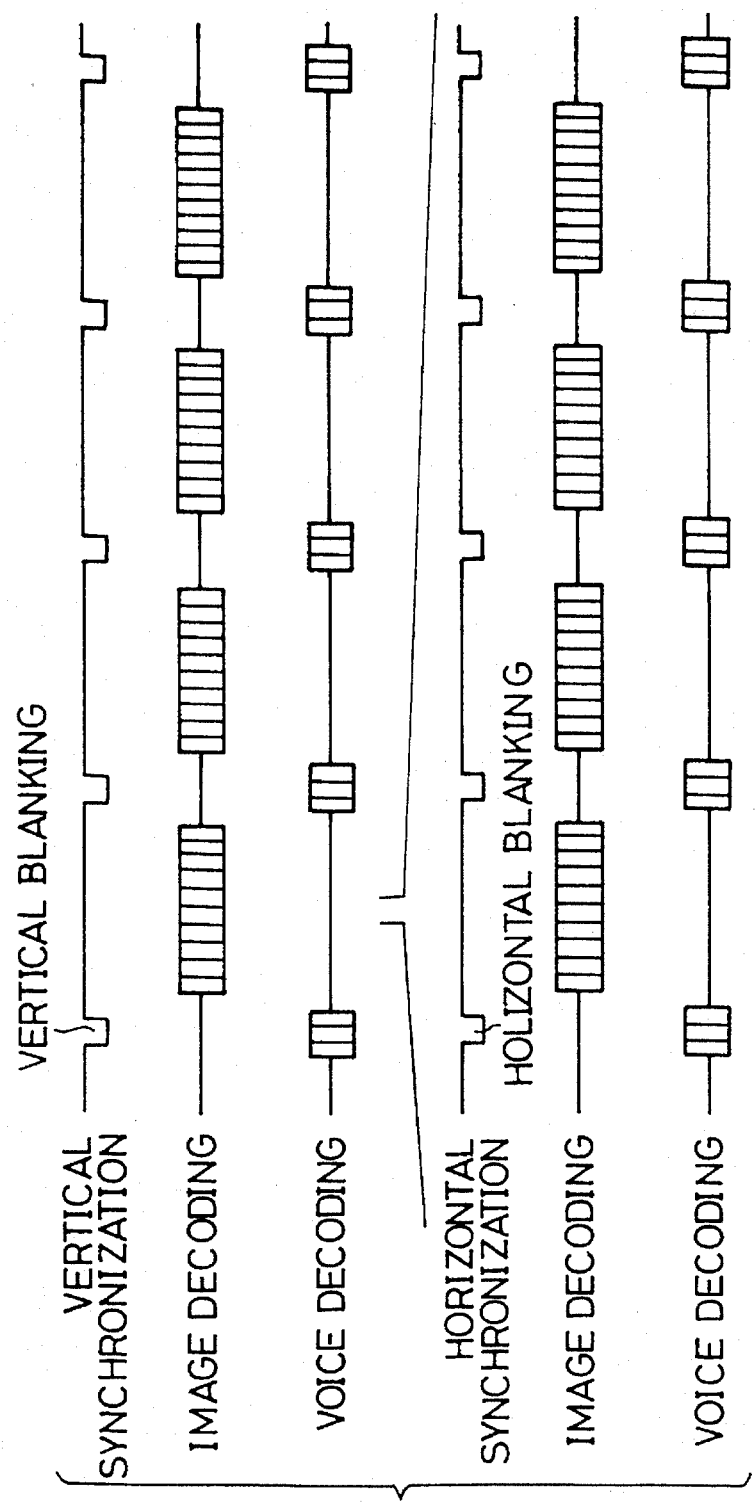
FIG. 7 is a timing chart of time divisional processing of image data and voice data.

FIG. 7 is a timing chart of time divisional sharing of image and voice decoding sections. In the case of the NTS system, similar to the above explanation, a valid area with respect to a frame image is set for 480 horizontal periods among 525 horizontal periods and an invalid area is set for the remaining 45 horizontal periods. 768 pixels among 910 pixels constitute the valid area for the horizontal periods and the remaining pixels constitute the invalid area.

As shown in FIG. 7, voice data are first decoded and stored to the RAM 33. Image data are decoded by using a decoding means for an effective image period and the voice data stored to the RAM are outputted for this effective image period.

Figure 8:
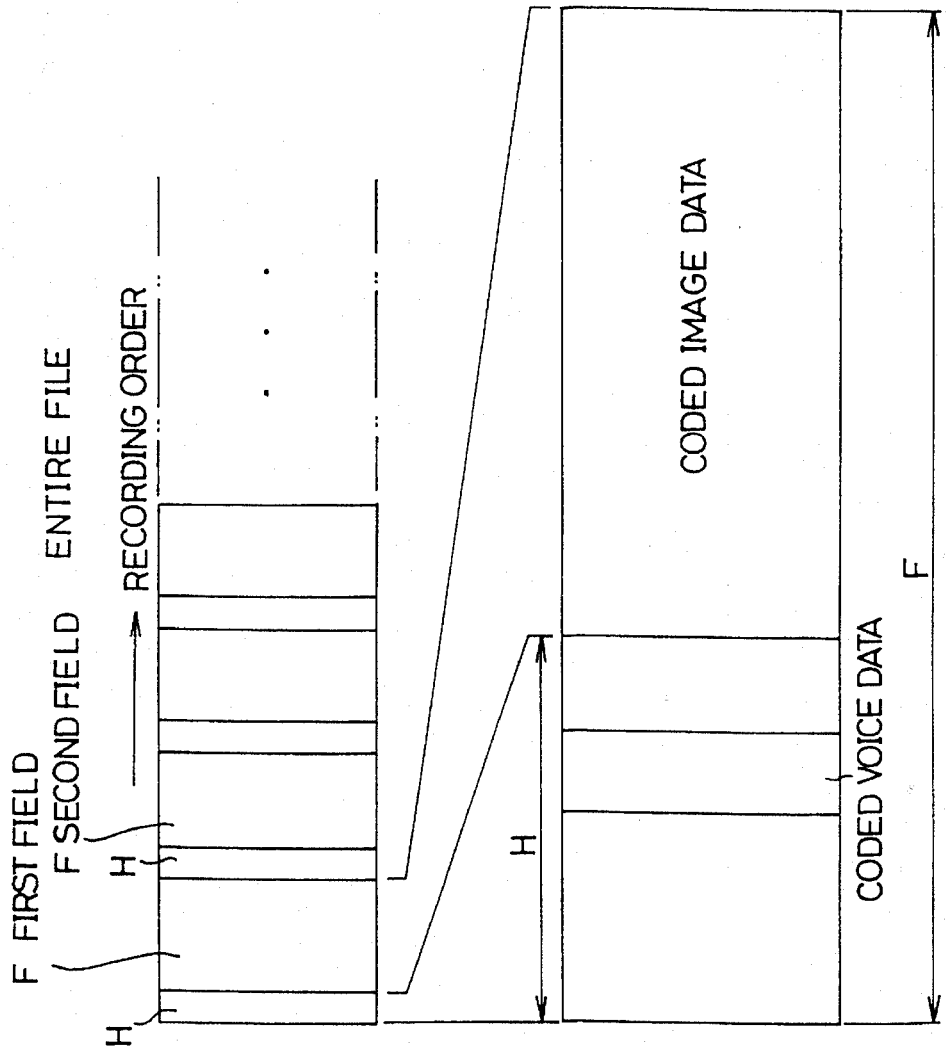
FIG. 8 is a view for explaining a recording state of data in a memory card.

FIG. 8 shows a format of image and voice files recorded into the memory card. As shown in FIG. 8, one image file F is made every field. A voice is recorded to a header portion H of the image file F to synchronize the voice with an image. Recorded voice data are provided for a field period. A sampling frequency of an aural signal at this time is equal to an integer multiple of a file frequency or a field frequency.

For example, when a voice for the field period is recorded to a header region of a JPEG file, a unit recording period of the voice is equal to an integer multiple of that of an image so that the synchronous relation between the voice and the image is preferably provided.

When effective image data with respect to the above image data are completely compressed and extended, an interrupt signal is outputted from the image data compression/extension circuit 42 to the CPU 51 so as to transmit this completion. Accordingly, when the image coding means is constructed by a variable length coding system, it is not necessary for the CPU 51 to monitor the completion of the above compression and extension of the image data at any time so that system performance can be improved.

In the image data compression/extension circuit 42, the quantizing table 22 explained on the basis of FIG. 2 is made by scaling and calculating a basic quantizing table using a scale factor and can be read by the CPU 51. Accordingly, when JPEG is used in the image coding system and the scale factor is used to control a coding amount, it is not necessary to take time for calculating the quantizing table recorded to the JPEG file by using the CPU 51 so that a moving picture can be recorded.

As mentioned above, in accordance with a first structure of a still camera of the present invention, an image data coding means and a voice data coding means are shared in time division. Accordingly, an image and a voice can be recorded and the size of a circuit structure constituting the coding means, cost of the circuit structure and power consumption can be reduced.

In accordance with a second structure of the still camera of the present invention, a weight of each of frequency bands of a quantizing table in the coding means is changed so that the voice can be recorded in an arbitrary state without adding any special circuit.

In accordance with a third structure of the still camera of the present invention, voice data are recorded to a header portion of a still picture image file so that the synchronous relation between image and voice data is held. Accordingly, it is possible to prevent troubles in edition of images and voices so that the images and the voices can be easily edited.

In accordance with a fourth structure of the still camera of the present invention, portions of the image data coding means and the voice data coding means are shared in time division. The image data are coded for an effective image data period. The voice data are coded for a vertical or horizontal blanking period. Accordingly, the time division can be efficiently made so that the still camera can be made compact and cheaply manufactured.

In accordance with a fifth structure of the still camera of the present invention, the voice data coding means has a memory for storing the voice data before coding for the effective image data period. Accordingly, the voice data can be coded without losing the voice data for the effective image data period.

In accordance with a sixth structure of the still camera of the present invention, the image data coding means transmits the completion of coding processing of effective image data to a CPU by using an interrupt signal. Accordingly, when the image data coding means is constructed by a variable length coding system, it is not necessary for the CPU to monitor the completion of image data coding at any time so that system performance can be improved.

In accordance with a seventh structure of the still camera of the present invention, the image data coding means makes a quantizing table by scaling and calculating a basic quantizing table using a scale factor, and a central processing unit (CPU) can read the quantizing table. Accordingly, when JPEG as a still picture coding international standard is used in an image data coding system and the scale factor is used to control a coding amount, it is not necessary to take time for calculating the quantizing table recorded to a JPEG file by the central processing unit so that a moving picture can be recorded.

In accordance with an eighth structure of the still camera of the present invention, a sampling frequency of a voice in the converting means for converting this voice to an electric signal is set to an integer multiple of a frame frequency or a field frequency of an image. Accordingly, for example, when the voice for a field period is recorded to a header region of the JPEG file, a unit recording period of the voice is equal to an integer multiple of that of the image so that the synchronous relation between the voice and the image is completely provided.

In accordance with a ninth structure of the still camera of the present invention, portions of an image data decoding means and a voice data decoding means are shared in time division. The image data are decoded for an effective image data period and the voice data are decoded for a vertical or horizontal blanking period. The ninth structure commonly has image and voice decoding sections so that the construction of the decoding means is simplified and the time division is efficiently made and the still camera can be made compact and cheaply manufactured.

In accordance with a tenth structure of the still camera of the present invention, the voice data coding means has a memory for storing the decoded voice data for the effective image data period. Accordingly, the voice data are held and can be normally outputted while the image data are decoded.

In accordance with an eleventh structure of the still camera of the present invention, the completion of decoding processing of effective image data can be transmitted from the image data decoding means to the central processing unit by using an interrupt signal. Accordingly, when the image data coding means is constructed by a variable length coding system, it is not necessary for the CPU to monitor the completion of image data decoding at any time so that system performance can be improved.

As mentioned above, in accordance with the present invention, it is possible to provide a still camera for preferably recording and reproducing a photographed image and a voice from a recording medium by a simplified structure.

Many widely different embodiments of the present invention may be constructed without departing from the spirit and scope of the present invention. I t should be understood that the present invention is not limited to the specific embodiments described in the specification, except as defined in the appended claims.

What is claimed is:

1. A still camera comprising:

photographing means for photographing a photographed object and outputting image data:

means for converting a voice to an electric signal and outputting the converted electric signal as a voice data;

an image data and voice data coding means connected to said photographing means and said converting means for coding the image data and the voice data in a time division manner and including a quantizing section and at least one coding section through which both of the image data and the voice data are processed in the time division manner, wherein said image data and voice data coding means comprises a forward discrete cosine transformation section, a quantizing table for controlling said quantizing section, said quantizing section being connected to said forward discrete cosine transformation section and said quantizing table, a differential pulse code modulation section connected to said quantizing section, a run length coding section connected to said quantizing section, and a Huffman coding section connected to said differential pulse code modulation section and said run length coding section;

image data recording means connected to said image data and voice data coding means for recording the coded image data to a recording medium; and voice data recording means connected to said image data and voice data coding means for recording the coded voice data to the recording medium.

2. A still camera according to claim 1, wherein the quantizing section of said image data and voice data coding means performs a discrete cosine transformation and a weight of each of frequency bands of a quantizing table can be changed in accordance with an externally set voice mode.

3. A still camera according to claim 1, wherein unit voice data can be recorded to a header portion of a still picture image file in said recording medium.

4. A still camera comprising:

photographing means for photographing a photographed object and outputting image data;

means for converting a voice to an electric signal and outputting the converted electric signal as a voice data;

an image data and voice data coding means connected to said photographing means and said converting means for coding the image data and the voice data in a time division manner and including a quantizing section and at least one coding section through which both of the image data and the voice data are processed in the time division manner, wherein said image data and voice data coding means comprises a forward discrete cosine transformation section, a quantizing table for controlling said quantizing section, said quantizing section being connected to said forward discrete cosine transformation section and said quantizing table, a differential pulse code modulation section connected to said quantizing section, a run length coding section connected to said quantizing section, and a Huffman coding section connected to said differential pulse code modulation section and said run length coding section;

image data recording means connected to said image data and voice data coding means for recording the coded image data to a recording medium; and voice data recording means connected to said image data and voice data coding means for recording the coded voice data to the recording medium, said image data and voice data coding means coding the image data for an effective image data period and coding the voice data for a vertical or horizontal blanking period.

5. A still camera according to claim 4, wherein said image data and voice data coding means has a memory for storing the voice data before coding for the effective image data period.

6. A still camera according to claim 4, wherein an interrupt signal relative to a completion of coding processing of effective image data is outputted from said image data and voice data coding means to a central processing means.

7. A still camera according to claim 4, wherein said image data and voice data coding means makes a quantizing table by scaling and calculating a basic quantizing table using a scale factor, and a central processing means can read the quantizing table.

8. A still camera according to claim 4, wherein a sampling frequency of the voice in the converting means for converting the voice to an electric signal is set to an integer multiple of a frame frequency or a field frequency of an image.

* * * * *